Figure 1:
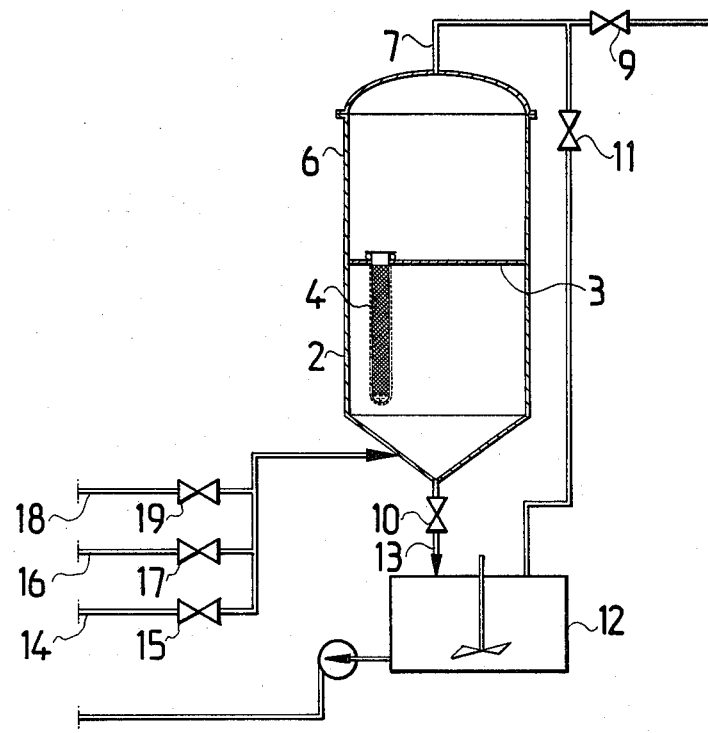

United States Patent [19]

Lumikko

[11] 4,388,197

[45] Jun. 14, 1983

[54] PROCEDURE FOR SEPARATING FINELY DIVIDED MATTER FROM A SUSPENSION BY FILTERING

[75] Inventor: Juha Lumikko, Savonlinna, Finland

[73] Assignee: Enso-Gutzeit Oy, Savonlinna, Finland

[21] Appl. No.: 267,878

[22] Filed: May 28, 1981

[30] Foreign Application Priority Data

May 29, 1980 [FI] Finland ............................. 801741

[51] Int. Cl.³ ............................................. B01D 29/38
[52] U.S. Cl. ................................... 210/777; 210/928; 162/35; 162/189
[58] Field of Search .............................. 162/35, 41–43, 162/189, 190; 210/323.2, 928, 777

[56] References Cited

U.S. PATENT DOCUMENTS

| | | | |
|---|---|---|---|
| 1,860,570 | 5/1932 | Brodley et al. | 162/35 X |
| 3,833,464 | 9/1974 | Rolfe | 162/189 X |
| 4,073,678 | 2/1978 | Hammond et al. | 162/35 X |
| 4,264,445 | 4/1981 | Lumikko et al. | 210/323.2 |

Primary Examiner—Thomas G. Wyse
Attorney, Agent, or Firm—Toren, McGeady and Stanger

[57] ABSTRACT

Procedure for separating finely divided matter from a suspension by filtration in a periodically operated pressure filter including a filter tank into which the suspension to be filtered is supplied along with lime sludge (or $CaCO_3$) as a filtering auxiliary substance. The lime sludge forms a filtering layer on the surface of filtering elements and the suspension to be filtered passes through this layer for separating sediment. The pressure filter contains a plurality of filtering elements extending downwardly from the roof of the filter tank so that the filtrate flows through the elements to a superposed filtrate collecting tank. The lime sludge collects on the outer surface of the filtering elements and is periodically detached by a countercurrent washing operation. Green liquor, from which the soda sediment is to be separated, is used as the suspension to be filtered.

3 Claims, 2 Drawing Figures

PROCEDURE FOR SEPARATING FINELY DIVIDED MATTER FROM A SUSPENSION BY FILTERING

The present invention concerns a procedure for separating finely divided matter from a suspension by means of filtering performed in a periodically operating pressure filter comprising a filter tank into which is supplied, to serve as a filtering auxiliary substance, lime sludge (or $CaCO_3$), with the aid of which on the surface of the filtering elements is established a filtering layer, and the suspension which one desires to filter, said pressure filter comprising a plurality of filtering elements, through which the filtrate flows and which on the inside communicate with a filtrate collecting tank located above and which thereby on their outside collect sludge, which is periodically detached by the countercurrent washing principle.

A procedure of similar type is known in the art through the U.S. Pat. No. 1,138,551. The filtering auxiliary substance (or $CaCO_3$) first creates upon the filter surface a layer through which the suspension to be filtered is subsequently drained.

Lime sludge has proved to have excellent properties for use as a filtering auxiliary substance. Lime sludge is associated with the cellulose manufacturing process. Lime sludge has a remarkably large grain size. Thereby the draining characteristics of lime sludge are good. Lime sludge is formed in the later process stage (the causticizing step) when white liquor is being prepared.

A prerequisite for economical manufacturing of sulphate cellulose is regeneration of the cooking liquors. Part of this regeneration is constituted by the making of white liquor by causticizing, which involves that milk of lime and green liquor are reacted with each other. The green liquor is produced when the soda melt containing sodium chemicals is conducted from the bottom of the soda boiler furnace into a separate dissolving tank. In the tank, the soda melt is dissolved in dilute liquor. The solution thus obtained is soda liquor, or green liquor. Most notable among the sodium chemicals in green liquor are sodium carbonate ($Na_2CO_3$) and sodium sulphide ($Na_2S$). Green liquor also contains insoluble compounds, such as metal oxides, silicates, soot and other impurities, which are called soda sediment. The soda sediment must be removed from the chemicals cycle because it is enriched therein and hampers the manufacturing of the white liquor obtained at causticizing. The soda sediment is a worthless residue which is removed from the cycle after washing. The green liquor purified of sediment is conducted to the causticizing step for the making of white liquor.

Nowadays, the soda sediment is separated from the green liquor in that the green liquor formed in the dissolver of the soda boiler is pumped into a green liquor clarifier. The clarifier is a round-bottomed vertical cylinder with a large diameter, 15–20 meters. The height over the floor frequently exceeds 10 meters. In the centre of the clarifier there is a smaller cylinder, into which the green liquor is supplied and where the flow subsides. The soda sediment contained in the green liquor settles on the bottom of the clarifier. The clarified green liquor runs over an overflow edge located on the tank's outer rim, into a channel, and is thence conducted onward to the causticizing plant. The soda sediment that has settled on the bottom is scraped off with the aid of a rotating scraper means, into a pocket located in the centre of the clarifier. From this pocket the soda sediment is conducted to the washing step.

It is thus understood that the green liquor clarifier serves as a storage container and as a soda sediment separator. The settling of soda sediment and its separation from the green liquor is variable. The sediment loading of green liquor varies in practice, depending on the equipment and the running parameters, from a few hundred milligrammes to several thousand milligrammes per liter of clarified green liquor. These values are not compatible with the purity values which a modern sulphate cellulose mill requires to be complied with. Moreover, green liquor containing too much sediment prevents in the next process step, that is in the causticizing step, the use of optimum running parameters and thereby results in economic losses.

In the cellulose manufacturing process, the causticizing and the separation of soda sediment from the green liquor are closely adjacent to each other. The aim of the present invention is to profit by this circumstance. The procedure of the invention is characterized in that for suspension to be filtered is used green liquor, from which the soda sediment is separated.

Separation of the soda sediment from green liquor by filtering has not been economically successful in practice up to now. The sediment mainly consists of finely divided substances having a poor draining capacity and tending to fill the filtering cloth within a short time. The equipment would need to be extraordinarily bulky, and therefore uneconomical. It is possible by the procedure of the present invention to perform the filtering economically, and the purity values of the filtrate are substantially superior to those achieved with the clarifying method in common use at present.

Figure 2:
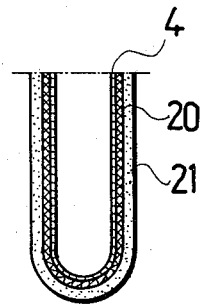

The invention is described more closely in the following with reference to the attached drawing, wherein:

FIG. 1 presents, schematically, a pressure filter;

FIG. 2 shows the lower end of the filtering element, sectioned.

The pressure filter depicted in FIG. 1 is in itself known in the art. Up to date, the filter has been employed as follows. The substance to be filtered arrives in the filtering tank 1 by the input line 14, supplied by a feed pump (not depicted). From the roof 3 of the tank 2 have been suspended cylindrically shaped filtering elements 4. Of these there is a plurality, although in the drawing only one such element has been depicted, considerably enlarged. The substance which one desires to filter is filtered under effect of the pressure prevailing in the filtering tank 2 through the mantle on the filtering element 4, and the solid matter is deposited on the surface of the filter mantle. The filtrate goes, urged on by the feed pump, to the filtrate draining pipe 7, and further to subsequent treatment steps. The removal of the solid matter deposited on the filtering element 4, that is on the mantle, is accomplished as follows. The valves 15 and 9 are closed. Valves 11 and 10 are opened. The pure filtrate in the collecting tank 6 will now flow through the filtering elements 4 into the filtering tank 2 and, doing so, detach the solid matter layer from the surface of the mantles. Through the drain conduit 13, solid matter and filtrate go to the collecting tank 12, whence they are pumped to be carried towards further treatment steps. When the filter has been emptied, the valve 10 is closed and valve 15 opened, and the feed pump is started. After the filter has been filled, the valve 11 is closed and valve 9 opened, and a new filtering cycle begins.

As taught by the present invention, green liquor is filtered with the apparatus just described, as follows. The filter 2 is empty to begin with. The valves 10 and 11 are closed. Valve 9 is opened. By opening the valve 19 in the pipeline 18, the lime sludge solution (a mixture of lime sludge and water or lime sludge and liquor) is conducted into the filter 2 from the causticizing section. The valve 17 in the pipeline 16 is likewise opened, whereby into the filter is supplied previously filtered, stored green liquor. The storage tank has not been depicted. The filter 2 is thus filled with lime sludge solution and green liquor. The large-grain lime sludge is deposited on the surface of the filter fabric of the filtering element 4 to form a layer 20, and the filtrate departs by the pipe 7 towards further treatment steps. The quantity of water or liquor entering together with the lime sludge by the pipe 18 is minor compared with the amount of green liquor. It has no detrimental effect whatsoever on the process. When a thick enough, uniform lime sludge layer 20 has been obtained on the surface of the filtering elements 4, the valves 19 and 17 are closed and at the same time the valve 15 in the pipeline 14 is opened. The green liquor to be filtered hereby gains access to the filter. The sediment in the green liquor will be filtered out upon the lime sludge layer 20 covering the surface of the filtering elements 4, to become a layer 21. The lime sludge course 20 prevents the penetration of the soda sediment into the filtering fabric. As the soda sediment layer 21 increases to great thickness, the draining resistance increases and the differential pressure across the filtering element becomes higher. The sediment course 20,21 must be removed. This is accomplished in a manner known in the art: by performing a countercurrent flushing operation through the filtering elements. The valves 15 and 9 are closed. Valves 11 and 10 are opened. The filter then begins to empty and the soda sediment 21 and lime sludge layer 20 on the surface of the filtering elements 4 are detached from the filtering fabric, by action of the countercurrent flow. The filter empties itself into the tank 12, whence the mixture is pumped to further treatment steps. When the filter has been emptied, the operation is commenced as described above.

In case the content of soda sediment in the green liquor to be filtered is high, the filtering step will have a short duration because the sediment rapidly clogs the lime sludge layer upon the surface of the filtering elements 4. It is therefore advantageous in such instances to proceed as follows. A lime sludge layer is established on the filtering surfaces of the filter, as in the preceding embodiment. At the moment when the lime sludge layer has reached a sufficient thickness, the valve 17 only is closed, thereby stopping the flow into the filter 2 of green liquor that has already been filtered. The valve 15 in the pipeline 14 is opened, as in the preceding embodiment. The valve 19, however, is not fully closed. This causes a small amount of large-grain lime sludge to flow continuously into the filter. There begins to accumulate, upon the surface of the filtering elements, finely divided soda sediment and also a small amount of large-grain lime sludge. Hereby the filtering surfaces are not rapidly clogged, and the length of one filtering cycle increases. The amount of lime sludge supplied into the filter is minor, compared with that of soda sediment.

If the content of soda sediment in the green liquor to be filtered is low, say 100 mg per one liter of green liquor, the following, highly simple favourable embodiment of the invention may be used. The lime sludge course on the surface of the filtering elements 4 is produced in continuous action simultaneously with the actual filtering process. This is feasible owing to the low soda sediment content. When the filter is empty, valves 11 and 10 are closed. Valve 9 is opened. The valve 19 in the lime sludge solution line 18 and the valve 15 in the entry line 14 for the green liquor to be filtered are opened. The filter is then entered by both lime sludge and green liquor, their solids being deposited on the surface of the filtering elements 4. The soda sediment, the amount of which is thus understood to be low, cannot clog the filtering elements because large-grain lime sludge is also deposited on the elements' surface. In situations where the soda sediment has an exceedingly small grain size, the recommendable procedure is to arrange for the flow rate of lime sludge entering through the valve 19 at the beginning of the filtering cycle to be maximum and to reduce during the filtering step the lime sludge flow into the filter 2. One ensures hereby that not even small soda sediment particles have a chance to clog the filtering fabrics.

It is obvious to a person skilled in the art that different embodiments of the invention may vary within the scope of the claims following hereinbelow.

I claim:

1. Improvement in a method of separating finely divided matter from a suspension by filtration in a periodically operated pressure filter unit including a filter tank having a roof, a filtrate collecting tank located above the filter tank, a plurality of filtering elements extending downwardly from the roof to the filter tank and the interior of the filtering elements communicating with the filtrate collecting tank, comprising the steps of introducing a lime sludge (or $CaCO_3$) into the filter tank, flowing the lime sludge under pressure through the filtering elements for depositing large-grain lime sludge on the exterior surface of the filtering elements within the filter tank while filtrate flows through the filtering elements into the filtrate collecting tank, flowing a green liquor containing sediment into the filter tank and passing the green liquor through the lime sludge layer on the exterior surface of the filtering elements and filtering the sediment in the green liquor on the lime sludge with the filtrate passing through the filtering elements into the filtrate collecting tank.

2. Improvement in a method, as set forth in claim 1, including simultaneously introducing the lime sludge and the green liquor containing the sediment into the filter tank.

3. Improvement in a method, as set forth in claim 1, including the step of introducing the lime sludge into the filter tank at the beginning of the filtering cycle so that the lime sludge is a multiple of the amount of soda sediment present in the green liquor supply introduced into the filter tank.

* * * * *